US010535874B2

United States Patent
Lee et al.

(10) Patent No.: US 10,535,874 B2
(45) Date of Patent: Jan. 14, 2020

(54) POSITIVE ELECTRODE ACTIVE MATERIAL FOR SECONDARY BATTERY, METHOD FOR PREPARING SAME, AND SECONDARY BATTERY COMPRISING SAME

(71) Applicant: LG Chem, Ltd., Seoul (KR)

(72) Inventors: Bo Ram Lee, Daejeon (KR); Ji Young Park, Daejeon (KR); Sun Sik Shin, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 480 days.

(21) Appl. No.: 15/363,134

(22) Filed: Nov. 29, 2016

(65) Prior Publication Data

US 2017/0155146 A1 Jun. 1, 2017

(30) Foreign Application Priority Data

Nov. 30, 2015 (KR) .................. 10-2015-0168684
Nov. 28, 2016 (KR) .................. 10-2016-0159214

(51) Int. Cl.
*H01M 4/525* (2010.01)
*H01M 4/505* (2010.01)
*H01M 10/0525* (2010.01)

(52) U.S. Cl.
CPC .......... *H01M 4/525* (2013.01); *H01M 4/505* (2013.01); *H01M 10/0525* (2013.01)

(58) Field of Classification Search
CPC .. C01G 53/50; C01P 2004/03; C01P 2004/51; C01P 2006/12; C01P 2006/40; H01M 4/505; H01M 4/525; H01M 10/0525
See application file for complete search history.

(56) References Cited

U.S. PATENT DOCUMENTS

2015/0147655 A1   5/2015   Park et al.
2017/0077496 A1*  3/2017   Liu .................. C01G 53/00

FOREIGN PATENT DOCUMENTS

KR   20050083869 A   8/2005
KR   20150026864 A   3/2015

OTHER PUBLICATIONS

Yang-Kook Sun el al., "A novel concentration-gradient Li[Ni0.83Co0.07Mn0.10]O2 cathode material for high-energy lithium-ion batteries", Journal of Materials Chemistry, Jan. 13, 2011, vol. 21, pp. 10108-10112.

* cited by examiner

*Primary Examiner* — Miriam Stagg
*Assistant Examiner* — Lilia Nedialkova
(74) *Attorney, Agent, or Firm* — Lerner, David, Littenberg, Krumholz & Mentlik, LLP

(57) ABSTRACT

A positive electrode active material for a secondary battery is provided. The positive electrode active material is a secondary particle including primary particles of a lithium composite metal oxide that contains nickel, cobalt, and manganese, wherein the manganese content in the lithium composite metal oxide exceeds 50 at % with respect to the sum content of nickel, cobalt, and manganese, and the primary particle is doped with one or two or more dopant elements selected from the group consisting of Nb, Sn, Mo, and Ta, the dopant element content being higher in a surface region of the primary particle than in the interior of the primary particle, and the dopant element concentration being 500 to 5,000 ppm with respect to the total weight of the positive electrode active material. In addition, a lithium secondary battery which includes the positive electrode active material is provided.

11 Claims, 3 Drawing Sheets

POSITIVE ELECTRODE ACTIVE MATERIAL FOR SECONDARY BATTERY, METHOD FOR PREPARING SAME, AND SECONDARY BATTERY COMPRISING SAME

CROSS-REFERENCE TO RELATED APPLICATION(S)

This application claims the benefit under 35 U.S.C. § 119(a) of a Korean patent application filed on Nov. 30, 2015 in the Korean Intellectual Property Office and assigned Serial number 10-2015-0168684, and a Korean patent application filed on Nov. 28, 2016 in the Korean Intellectual Property Office and assigned Serial number 10-2016-0159214, the entire disclosure of which is hereby incorporated by reference.

TECHNICAL FIELD

The present disclosure relates to a positive electrode active material for a secondary battery which, when utilized in a battery, may improve the capacity and lifetime properties of the battery by improving the surface stability of primary particles composing the positive electrode active material, and in particular, may minimize degradation of the lifetime properties at high voltages, a method for preparing the same, and a secondary battery including the same.

BACKGROUND

Demand for secondary batteries as an energy source is rapidly increasing due to the increase in technological development and demand for mobile devices. Among such secondary batteries, lithium secondary batteries, which have a high energy density and voltage, a long lifetime, and a low self discharge rate, have been commercialized and are widely used. However, lithium secondary batteries have a limitation of repeated charge/discharge cycles dramatically reducing the lifetime of the batteries. In particular, the limitation is more severe at high temperatures. This is due to effects which are generated when moisture inside the batteries or the like causes electrolyte decomposition or active material degradation, as well as increased internal resistance of the battery.

Accordingly, a positive electrode active material for lithium secondary batteries which is currently being actively developed and used is $LiCoO_2$, which has a layered structure. $LiCoO_2$ is the most widely used positive electrode active material, having excellent lifetime properties and an excellent charge/discharge efficiency. However, due to having low structural stability, the application of $LiCoO_2$ in battery capacity-increasing techniques is limited.

Various lithium transition metal oxides have been developed as positive electrode active materials for replacing $LiCoO_2$, such as $LiMnO_2$ and $Li_2MnO_3$, which have layered structures, $LiMn_2O_4$, which has a spinel crystal structure, $LiNiO_2$, $LiFePO_4$, and $Li(Ni_{x1}Co_{y1}Mn_{z1})O_2$.

Among these, lithium manganese-based oxides such as $LiMnO_2$, $Li_2MnO_3$, and $LiMn_2O_4$, have the advantages of excellent thermal stability and low cost, but also have the limitations of small capacity, and poor high-temperature properties. Specifically, although initially having a layered crystal structure, after a charge/discharge, $LiMnO_2$ is transformed into a spinel crystal structure, and consequently there are limitations of a decreased lithium ion movement rate and a reduction in capacity. $LiMn_2O_4$ has been commercialized to a degree as a low-cost product. However, $LiMn_2O_4$ has a low capacity due to having a spinel crystal structure, and poor lifetime properties due to a structural deformation—Jahn-Teller distortion—caused by $Mn^{3+}$. $Li_2MnO_3$ has a high Mn content and thus has the advantages of being extremely low-cost and having an extremely large capacity at high voltage, and exhibits an effect in which the capacity increases after a plateau region from 4.4 to 4.6 V is activated. However, $Li_2MnO_3$ has a limitation in which, past this plateau region, the increased severity of structural changes causes the electrical properties to become worse. It is known that this is due to structural changes causing a transformation from a layered structure to a spinel crystal structure such that contact between domains is loosened. Due to such properties, practical application of $Li_2MnO_3$ in batteries is difficult.

Thus, nickel-based positive electrode active materials having a discharge capacity that is at least 20% higher than cobalt-based positive electrode active materials are being actively developed. $LiNiO_2$ has the same layered structure as $LiCoO_2$ and has an initial discharge capacity of 180 to 200 mAh/g. However, $LiNiO_2$ is transformed from a monoclinic structure to a hexagonal structure when charged/discharged, and thus becomes structurally unstable. Consequently, there are limitations in that the capacity rapidly decreases when continuously charged/discharged, the thermal stability and cycle properties are poor, and it is synthesizing a quantitatively stoichiometric material is difficult. In order to overcome such limitations, attempts have been at achieving structural stability by adding cobalt to $LiNiO_2$, but since the amount of cobalt added must be at least 30 mol %, there is a limitation of causing a relative decrease in capacity.

Due to such circumstances, the material which is recently receiving the most attention as a positive electrode active material to replace $LiCoO_2$ is a lithium nickel manganese cobalt oxide containing excessive amounts of lithium, that is, $Li_{a1}(Ni_{x2}Co_{y2}Mn_{z2})_{2-a1}O_2$ (where a1, x2, y2, and z2 are each independently atomic ratios of oxide composition elements and satisfy the conditions $1<a1\leq1.5$, $0<x2\leq1$, $0<y2\leq1$, $0<z2\leq1$, $0<x2+2y+z2\leq1$). This material is less expensive than $LiCoO_2$ and has advantages in that the material may be used for high capacity and high voltage, but has the disadvantages of poor rate capability and poor lifetime properties at high temperatures.

To overcome such limitations, a method has been proposed for preparing a lithium transition metal oxide having a metal composition concentration gradient by synthesizing a core material and coating the exterior of the core material with a material having a different composition to prepare a double layer, and then mixing the coated core material with a lithium salt and heat treating. In this method, although the core and the external layer may be synthesized to have different metal compositions, the continuous metal composition concentration gradient is insufficiently formed in the positive electrode active material that is produced, and thus there are limitations in that the output characteristic-improving effect is unsatisfactory and reproducibility is low.

SUMMARY

Accordingly, an aspect of the present disclosure is to provide a positive electrode active material for a secondary battery, wherein, when the positive electrode active material is used in a battery, the improved surface stability of primary particles forming the positive electrode active material may improve the capacity and lifetime properties of the battery, and in particular, may minimize degradation of the lifetime properties at high voltages.

Another aspect of the present disclosure is to provide a preparation method for preparing the positive electrode active material.

Another aspect of the present disclosure is to provide a positive electrode including the positive electrode active material.

Another aspect of the present disclosure is to provide a lithium secondary battery including the positive electrode, a battery module, and a battery pack.

In accordance with an aspect of the present disclosure, a positive electrode active material for a secondary battery is provided. The positive electrode active material is a secondary particle including primary particles of a lithium composite metal oxide that contains nickel, cobalt, and manganese, wherein the manganese content in the lithium composite metal oxide exceeds 50 at % with respect to the sum content of nickel, cobalt, and manganese; and the primary particle is doped with one or two or more dopant elements selected from the group consisting of Nb, Sn, Mo, and Ta, the dopant element content being higher in a surface region of the primary particle than in the interior of the primary particle, and the dopant element concentration being 500 to 5,000 ppm with respect to the total weight of the positive electrode active material.

In accordance with another aspect of the present disclosure, a method for preparing the positive electrode active material is provided. The method includes preparing a precursor by mixing a nickel raw material, a cobalt raw material, and a manganese raw material, and then performing a coprecipitation reaction; and mixing the precursor with a lithium raw material and a dopant element-containing raw material, and then heat treating at a temperature of 900 to 1,100° C., wherein the manganese raw material is used in an amount such that the manganese content exceeds 50 at % with respect to the sum content of nickel, cobalt, and manganese, and the dopant element-containing raw material is used in an amount such that the concentration of the dopant element is 500 to 5,000 ppm with respect to the total weight of the positive electrode active material that is ultimately prepared, the dopant element including one or two or more selected from the group consisting of Nb, Sn, Mo, and Ta.

In accordance with another aspect of the present disclosure, a positive electrode including the positive electrode active material is provided.

In accordance with another aspect of the present disclosure, a lithium secondary battery including the positive electrode, a battery module, and a battery pack are provided.

BRIEF DESCRIPTION OF THE DRAWINGS

The drawings herein illustrate exemplary embodiments of the present disclosure, and together with the description, serve to better explain the technical concept of the present disclosure. Thus, the present disclosure should not be construed as limited to the features illustrated in the drawings.

DETAILED DESCRIPTION

Figure 1:
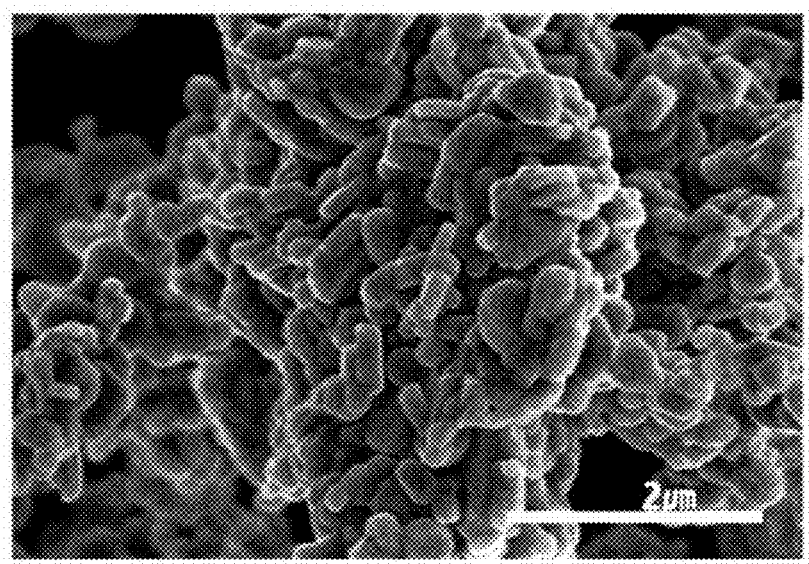
FIG. 1 is a scanning electron microscopy image of a positive electrode active material in Example 1-1.

Hereinafter, the present disclosure is described in greater detail to facilitate understanding thereof.

The wordings or terms used in the specification and claims are not limited to their typical or dictionary definitions. Rather wordings or terms as used herein are to be understood as defined by the inventor to best convey the technical concepts of the present disclosure.

A positive electrode active material according to an embodiment of the present disclosure is a secondary particle including primary particles of a lithium composite metal oxide that includes nickel, cobalt, and manganese. The manganese content in the lithium composite metal oxide exceeds 50 at % with respect to the sum content of nickel, cobalt, and manganese. The primary particle is doped with one or two or more dopant elements selected from the group consisting of Nb, Sn, Mo, and Ta. The content of the dopant element is higher in the surface region of the primary particle than in the interior of the primary particle. The dopant element concentration is 500 to 5,000 ppm with respect to the total weight of the positive electrode active material. The interior of the primary particle is a region in which the distance from the center of the particle is 0% to 70% of the particle radius. The surface region of the primary particle is a region in which the distance from the center of the particle is greater than 70% and at most 100% of the distance between from the center to the surface of the particle, that is, the particle radius. Although the surface region of the primary particle may depend on the size of the primary particle, the surface region of the primary particle may be the region in which the distance from the surface of the primary particle is less than 100 nm, or the region in which the distance from the surface of the primary particle is less than 50 nm. Meanwhile, the interior may indicate the region other than the surface region, that is, the region in which the distance from the center of the particle is 0% to 70% of the particle radius.

Typically, in order to improve the capacity properties of a positive electrode active material, methods have been considered in which excessive amounts of lithium and manganese are included in the active material. However, there is a limitation in that increasing the manganese content increases the non-reversible capacity and causes the lifetime properties of the active material to rapidly degenerate when a battery is operated at a high voltage of at least 4.5 V in order to achieve a high capacity. In the case of a positive electrode active material in the form of a secondary particle assembled from primary particles, the spacing between the primary particles becomes wider during charging, and thus undesirable side reactions with electrolyte solution infiltrating the widened gaps occur at the surface of the positive electrode material.

Regarding this, in the present disclosure, when synthesizing a precursor for a positive electrode active material including an excessive amount of manganese, by using a dopant element selected from the group consisting of highly surface-stabilizing Nb, Sn, Mo, and Ta, and adding the dopant element during a firing operation with a lithium raw material, it was possible to distribute more of the dopant element on the surface of the primary particle. Consequently, in the positive electrode active material of the present disclosure, the surface of the positive electrode active material has a high oxygen binding energy, changes to the c-axis in the crystal structure are suppressed during charging/discharging such structural stability is high, and excellent lifetime properties may be achieved even when 50 at % or more of manganese is included. Moreover, due to the dopant element present on the surface of the primary particles, side reactions with the electrolyte solution may also be effectively prevented. Consequently, when such a positive electrode active material according to the present disclosure is applied to a battery, the capacity and lifetime properties may be improved and, in particular, rapid degeneration of the lifetime properties under high-voltage operation may be prevented.

Specifically, the positive electrode active material according to an embodiment of the present disclosure is a secondary particle assembled from primary particles of a lithium composite metal oxide including nickel (Ni), cobalt (Co), manganese (Mn), and the dopant element (M). The dopant element content is higher in the surface region than in the interior of the primary particle.

More specifically, in the positive electrode active material according to an embodiment of the present disclosure, the difference—between the outermost surface and center of the primary particle—in the ratio of the atomic percentage of the dopant element to the sum of the atomic percentages of nickel, cobalt, and manganese (that is, M/(Ni+Co+Mn)) may be 0.2 to 1.2. When the range is satisfied, the structural stability of the primary particle itself is further enhanced, and consequently, the lifetime properties-improving effect may be further enhanced. When the ratio is below 0.2, the dopant element is unable to reliably bond with other metal elements such that uniform doping becomes difficult, and accordingly, the structural stability-enhancing effect may be negligible. When the ratio exceeds 1.2, reduced stability in the primary particle due to the sudden step difference in concentration is a concern.

In the positive electrode active material according to an embodiment of the present disclosure, the interior and surface region of the primary particle may include the dopant element such that the respective regions each have a single concentration value of the dopant element. In this case, due to the interior and surface region of the primary particle each independently having a differently shaped dopant element content distribution, a level difference resulting from the dopant element content difference may be formed at the contacting interface between the interior and surface region of the primary particle. Here, the dopant element content in the interior of the primary particle is lower than the dopant element content in the surface region.

In addition, in the positive electrode active material according to an embodiment of the present disclosure, the dopant element may be distributed such that there is a gradually increasing concentration gradient from the center to the surface of the primary particle, without an abrupt step change in concentration at the interface at which the interior and surface region of the primary particle meet. In this case, the slope of the concentration gradient in the interior and the surface region of the primary particle may each independently be a linear function of the particle diameter which changes with increased distance from the center of the primary particle, and may also be a quadratic function. The slope of the dopant element concentration gradient in the interior of the primary particle and the slope of the dopant element concentration gradient in the surface region may be the same or different. Since—as above—there is a gradual dopant element concentration gradient over the entire primary particle, there are no abrupt phase boundary regions present from the center to the surface of the primary particle, and thus the crystal structure is more stable, and furthermore, the thermal stability may be enhanced. When the slope of the dopant element concentration gradient is constant, the structural stability-improving effect may be further enhanced.

In the present disclosure, the change in dopant element content in the surface region and interior of the particle may be measured according to typical methods, and specifically, the content of the dopant element present on the surface may be measured using x-ray photoelectron spectroscopy (XPS), transmission electron microscopy (TEM), or energy dispersive x-ray spectroscopy (EDS).

In the positive electrode active material according to an embodiment of the present disclosure, the concentration of the dopant element may specifically be 500 to 5,000 ppm with respect to the total weight of the positive electrode active material. When the dopant element content in the positive electrode is lower than 500 ppm, the surface stability-improving effect due to the inclusion of the dopant element may be insignificant, and when exceeding 5,000 ppm, degradation of the capacity properties is a concern. More specifically, the concentration may be 500 to 3,000 ppm, and even more specifically, 1,500 to 3,000 ppm.

More specifically, in the positive electrode active material according to an embodiment of the present disclosure, the lithium composite metal oxide may include a compound represented by Formula 1.

$$Li_a(Ni_xCo_yMn_zM_s)_{2-a}O_2 \quad \text{[Formula 1]}$$

In Formula 1, M is an element which, by moving—during a heat-treating operation for preparing the positive electrode active material—to the surface region of the particle according to the binding energy with constituent elements of the positive electrode active material, and to the concentration, may enhance the oxygen binding energy of the surface of the positive electrode active material or experience only a small change in the c-axis of the crystal structure during charge/discharge and thus be capable of enhancing the structural stability of the active material. M specifically includes one or two or more elements selected from the group consisting of Nb, Sn, Mo, and Ta.

In Formula 1 above, the conditions 1≤a≤1.5, 0<x<0.5, 0<y<0.5, 0<x+y<0.5, 0.5<z<1−x−y−s, x+y+z+s=1, and 0<s≤0.05 may be satisfied.

As such, by including in the lithium composite metal oxide, a lithium-rich oxide in which the molar ratio, Li/(Ni+Co+Mn+M), is at least 1, the structural stability of the active material may be improved, in particular at high temperatures, and thus capacity degradation may be prevented even at high temperatures. Such an effect becomes more effective as the positive electrode active material particles increase in size. If the molar ratio, Li/(Ni+Co+Mn+M), is lower than 1.0, there is a concern that the capacity may be degraded, and when exceeding 1.5, the particles become sintered during a firing process, and thus it may be difficult to prepare the active material. Considering the balance between the extent of the enhancement effect—resulting from control of the Li content—on the capacity properties of the positive electrode active material, and the sinterability during active material preparation, in Formula 1, a may be larger than 1.01 and at most 1.05.

In the lithium composite metal oxide represented by Formula 1, the Mn content may correspond to z, that is, 0.5<z<1−x−y−s. When z is 0.5 or lower, it is difficult to realize high-capacity properties, and when z is 1−x−y−s or higher, there is a concern that an increase in non-reversible capacity resulting from the inclusion of excessive amounts of manganese may cause the output properties and capacity properties to be degraded. Considering the extent of the enhancement effect on the battery properties resulting from the inclusion of elemental Mn, Mn may be included such that the Mn content specifically satisfies 0.6≤z<1−x−y−s, and more specifically, satisfies 0.6≤z≤0.8.

In Formula 1, elemental oxygen (O) may, within a predetermined range, be substituted with another anion. The other anion may be at least one element selected from the group consisting of halogen elements such as F, Cl, Br, I, etc., sulfur, and nitrogen. Due to such an anion substitution, there are advantages in that the binding strength with transition metals is improved and structural transformation of the active material is prevented. However, when the amount of anion substitution is excessive, the compound actually becomes unable to maintain a stable structure, and thus the lifetime properties may be degraded. Therefore, the possible range of anion substitution may be 0 to 20 mol % with respect to the total amount of oxygen, and more specifically, may be 0 to 10 mol %.

In order to increase the capacity of conventional batteries, it is desirable for the particle size of the positive electrode active material to be large. However, in this case, the surface area is relatively small, and thus there is a limitation in that the active surface area in contact with the electrolyte is reduced such that the rate capability and the initial capacity are degraded. Positive electrode active materials of secondary particles assembled from fine primary particles are usually used in order to overcome this limitation. However, in the case of positive electrode active materials formed as secondary particles in this manner, it is easy for lithium ions moving to the surface of the active material to react with moisture or $CO_2$ in the air and thereby form surface contaminants such as $Li_2CO_3$ or LiOH. Since the surface contaminants thus formed reduce battery capacity or are decomposed inside the battery to generate gasses that cause a swelling effect in the battery, there is a severe limitation with regard to high-temperature stability.

Regarding this, as in the present disclosure, the above limitation may be overcome by surface doping with the element capable of stabilizing the surface of the primary particle while also controlling the doping amount and the size of the secondary particle. Specifically, in the positive electrode active material according to an embodiment of the present disclosure, the average particle diameter ($D_{50}$) of the positive electrode active material may be 3 to 20 µm. The size of the primary particle and secondary particle in the positive electrode active material may be adjusted by controlling the reactant concentration, the reaction time, or the heat treatment temperature and the like when preparing the positive electrode active material. In the present disclosure, both the dopant element content and the average particle diameter ratio of the secondary particle may be controlled to satisfy the range described above, and the interparticle separation of the primary particles may thereby be minimized while ensuring convenient intercalation and deintercalation of lithium ions. Consequently, surface contact with the electrolyte solution may be minimized to prevent lifetime property degradation due to side reactions. More specifically, considering the enhancement effect due to the novel structure, on the rate capability and initial capacity properties, the average particle diameter of the secondary particle may be 4 to 12 µm.

In the present disclosure, the average particle diameter ($D_{50}$) may be defined as the particle diameter at 50% in the particle diameter distribution. In the present disclosure, the average particle diameter ($D_{50}$) of the positive electrode active material particles may be measured using, for example, a laser diffraction method. For example, in the method for measuring the average particle size ($D_{50}$) of the positive electrode active material, after dispersing the positive electrode active material particle in a dispersion medium and then using a commercial laser diffraction particle size analyzer (for example, the Microtrac MT 3000) to emit approximately 28 kHz ultrasonic waves at an output power of 60 W, the particle diameter at 50% in the particle diameter distribution obtained from the particle size analyzer may be calculated.

The BET specific surface area of the positive electrode active material according to an embodiment of the present disclosure may be 0.1 to 3.0 $m^2/g$. When the BET specific surface area of the positive electrode active material exceeds 3.0 $m^2/g$, the size of the active material particle is significantly reduced, and thus reduced dispersibility of the positive electrode active material in the active material layer due to cohesion between positive electrode active materials and increased resistance in the electrode are concerns. When the BET specific surface area of the positive electrode active material is below 0.1 $m^2/g$, reduced dispersibility of the positive electrode active material itself and reduced capacity are concerns. More specifically, the BET specific surface area of the positive electrode active material may be 0.5 to 3.0 $m^2/g$, and more specifically, 1.51 to 2.50 $m^2/g$.

In the present disclosure, the specific surface area is measured using the BET (Brunauer-Emmett-Teller) method, and specifically, may be derived using the BEL Japan BELSORP-mino II, from the amount of nitrogen gas adsorption at the liquid nitrogen temperature (77 K).

The positive electrode active material according to an embodiment of the present disclosure may have a tap density of at least 1.0 g/cc, or 1.0 to 2.5 g/cc. By having a high tap density in this range, high-capacity properties may be exhibited. In the present disclosure, the tap density of the positive electrode active material may be measured using a typical tap density measuring instrument, and specifically, may be measured using a tap density tester. More specifically, the positive electrode active material may have a tap density of 1.2 to 2.0 g/cc.

The positive electrode active material according to an embodiment of the present disclosure may be prepared through a preparation method including an operation for preparing a precursor by mixing a nickel raw material, a cobalt raw material, and a manganese raw material, and then performing a coprecipitation reaction (first operation); and an operation for mixing the precursor with a lithium raw material and a dopant element-containing raw material, and then heat treating at a temperature of 900 to 1,100° C. (second operation). Thus, according to another embodiment of the present disclosure, a preparation method for the positive electrode active material described above is provided.

Hereinafter, describing each operation in detail, a first operation in a preparation method for preparing the positive electrode active material is an operation for preparing a precursor using a nickel raw material, a cobalt raw material, and a manganese raw material.

Specifically, the precursor may be prepared by adding an ammonium cation-containing complex-forming agent and a basic compound to a metal element-containing solution prepared by mixing a nickel raw material, a cobalt raw material, a manganese raw material, and a dopant element (M)-containing raw material, and then performing a coprecipitation reaction. Here, the mixing ratio of each raw material may be appropriately determined such that the conditions for the content of each metal element are satisfied in the positive electrode active material that is ultimately prepared.

The metal element-containing solution may be prepared by adding each of the nickel raw material, the cobalt raw material, and the manganese-containing raw material into a solvent, specifically water, or a mixture of water and an organic solvent (specifically an alcohol or the like) which can be uniformly mixed with water, or solutions—specifically aqueous solutions—of the respective metal element-containing raw materials may be prepared, and the solutions may be used after being mixed.

An acetate, nitrate, sulfate, halide, sulfide, hydroxide, oxide, or oxyhydroxide and the like of a metal element may be used as the metal element-containing raw material, and if water-soluble, is not particularly limited.

For example, the cobalt raw material may be $Co(OH)_2$, CoOOH, $Co(SO_4)_2$, $Co(OCOCH_3)_2 \cdot 4H_2O$, $Co(NO_3)_2 \cdot 6H_2O$, or $Co(SO_4)_2 \cdot 7H_2O$ and the like, and one or a mixture of two or more thereof may be used.

The nickel raw material may be $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid salt of nickel, or a nickel halide and the like, and one or a mixture of two or more thereof may be used.

The manganese raw material may be a manganese oxide such as $Mn_2O_3$, $MnO_2$, or $Mn_3O_4$; a manganese salt such as $MnCO_3$, $Mn(NO_3)_2$, $MnSO_4$, manganese acetate, a dicarboxylic acid salt of manganese, citric acid manganese, or a fatty acid salt of manganese; an oxyhydroxide, or a manganese chloride and the like, and one or a mixture of two or more thereof may be used.

The ammonium cation-containing complex-forming agent may specifically be $NH_4OH$, $(NH_4)_2SO_4$, $NH_4NO_3$, $NH_4Cl$, $CH_3COONH_4$, or $NH_4CO_3$ and the like, and one or a mixture of two or more thereof may be used. The ammonium cation-containing complex-forming agent may be used in the form of an aqueous solution, and here, water, or a mixture of water and an organic solvent (specifically, an alcohol or the like) which can be uniformly mixed with water may be used as a solvent.

The ammonium cation-containing complex-forming agent may be added in an amount such that the molar ratio of the ammonium cation-containing complex-forming agent with respect to 1 mole of the metal salt solution is 0.5 to 1. Typically, an ammonium cation-containing complex-forming agent reacts with a metal in at least a 1:1 mole ratio to form a complex, but since unreacted portions—which did not react with a basic aqueous solution—of the complex change into an intermediate product and may be recovered and reused as an ammonium cation-containing complex-forming agent, the amount of chelating agent used in the present disclosure may be less than is typical. Consequently, the positive electrode active material may have increased crystallinity and be stabilized.

The basic compound may be an alkali metal or alkaline earth metal hydroxide such as NaOH, KOH, or $Ca(OH)_2$, or a hydrate thereof, and one or a mixture of two or more thereof may be used. The basic compound may also be used in the form of an aqueous solution. Here, water, or a mixture of water and an organic solvent (specifically, an alcohol or the like) which can be uniformly mixed with water may be used as a solvent.

The coprecipitation reaction may be performed at a pH of 11 to 13. When the pH is outside of this range, there is a concern of the size of the prepared precursor being changed or particle breakage occurring. There is also a concern of metal ions being eluted from the surface of the precursor and forming various oxides via side reactions. More specifically, the coprecipitation reaction may be performed at a pH of 11 to 12. The ammonium cation-containing complex-forming agent and the basic compound may be used in a molar ratio of 1:10 to 1:2 in order to satisfy the above pH range. Here, pH value indicates the pH value at a temperature of 25° C.

The coprecipitation reaction may be performed in an inert atmosphere of nitrogen or argon and the like, at a temperature of 30 to 80° C. A stirring operation may be selectively performed in order to increase the reaction speed. Here, the stirring speed may be 100 to 2,000 rpm.

The precursor particle is formed through the operation described above and precipitates in the reaction solution. Specifically, the precursor may include a compound represented by Formula 2 below.

  [Formula 2]

(In Formula 2, x, y and z are as defined above, and A is a hydroxyl group or an oxyhydroxy group)

After using a typical method to separate the precursor precipitated as a result of the reaction, a drying operation may be selectively performed.

The drying operation may be performed using a typical drying method, and may specifically be performed in a temperature range of 100 to 200° C. using a method such as heat treatment or hot air injection for 15 to 30 hours.

In the preparation method for preparing the positive electrode active material, a second operation is an operation for mixing the precursor prepared in the first operation with a lithium raw material and a dopant element (M)-containing raw material, and then heat treating to prepare the positive electrode active material.

The lithium raw material may be a lithium-containing carbonate (for example, lithium carbonate), hydrate (for example, lithium hydroxide monohydrate ($LiOH \cdot H_2O$)), hydroxide (for example, lithium hydroxide), nitrate (for example, lithium nitrate ($LiNO_3$)), or chloride (for example, lithium chloride (LiCl)) and the like, and one or a mixture of two or more thereof may be used. The amount of the lithium-containing raw material used may be determined according to the lithium transition metal content in the lithium composite metal oxide that is to be ultimately prepared, and specifically, the amount of the lithium-containing raw material used may be such that the molar ratio between the lithium included in the lithium raw material and the metal elements (Ni+Mn+Co) included in the transition metal (lithium/metal element molar ratio) is at least 1.0.

An acetate, nitrate, sulfate, ammonium salt, halide, sulfide, hydroxide, oxide, chloride, or oxyhydroxide and the like including at least one dopant element among Nb, Sn, Mo, and Ta may be used as the dopant element (M)-containing raw material. For example, when the dopant element (M) is Mo, molybdenum oxide or molybdenum sulfide and the like may be used. That amount of the dopant element (M)-containing raw material used may be in a range that allows the dopant element content condition to be satisfied in the positive electrode active material that is ultimately prepared.

When mixing the positive electrode active material precursor, the lithium raw material, and the dopant element-containing material, a sintering agent may be selectively further added. The sintering agent may specifically be an ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and the like, and one or a mixture of two or more thereof may be used. The content of the sintering agent used may be 0.01 to 0.2 moles with respect to 1 mole of the positive electrode active material precursor. When the sintering agent content is below 0.01 moles and thus excessively low, the effect of enhancing the sintering properties of the positive electrode active material precursor may be negligible, and when the sintering agent content is above 0.2 moles and thus excessively high, there is a concern that due to the excessive amount of the sintering agent, the performance of the positive electrode active material may be degraded and the initial capacity of the battery when charging/discharging may be reduced.

When mixing the positive electrode active material precursor, the lithium raw material, and the dopant element-containing material, a moisture removal agent may be selectively further added. Specifically, the moisture removal agent may be citric acid, tartaric acid, glycolic acid, or maleic acid, and one or a mixture of two or more thereof may be used. The content of the moisture removal agent used may be 0.01 to 0.2 moles with respect to 1 mole of the positive electrode active material.

The heat-treating operation in the second operation may be performed at 900 to 1,100° C. When the temperature during heat treatment is below 900° C., reduced discharge capacity per unit weight, degraded cycle characteristics, and reduced operating voltage are concerns due to the remaining unreacted raw material, and when the temperature is above 1,100° C., reduced discharge capacity per unit weight, degraded cycle characteristics, and reduced operating voltage are concerns due to the formation of side reaction products.

The heat-treating operation may be performed for 5 to 30 hours in an oxidizing atmosphere such as air or oxygen, or a reducing atmosphere including nitrogen or hydrogen. A diffusion reaction between the particles may be sufficiently achieved through the heat-treating operation performed under such conditions. Moreover, metal diffusion occurs even in areas in which the internal metal concentration is uniform, and thus a metal oxide having a continuous metal concentration distribution from the center to the surface may be prepared.

Meanwhile, a preliminary firing in which the temperature is maintained for 5 to 20 hours at 250 to 650° C. may be selectively performed before the heat-treating operation. After the heat-treating operation, an additional heat-treating operation may be selectively performed at 650 to 750° C. for 10 to 20 hours.

In the positive electrode active material prepared via the preparation method as above, the content of the surface-stabilizing element doping the lithium composite metal oxide increases closer to the surface such that the surface stability may be enhanced for not only the secondary particle of the active material, but also the primary particle, and thus when the positive electrode active material is applied to a battery, the capacity and lifetime properties of the battery may be improved, and in particular, the degradation of the lifetime properties at high voltages may be minimized.

According to another embodiment of the present disclosure, an electrode comprising the positive electrode active material described above is provided.

Specifically, the positive electrode includes a positive electrode current collector and a positive electrode active material layer which is formed on the positive electrode current collector and includes the positive electrode active material.

The positive electrode current collector which is conductive and does not cause a chemical change to the battery is not particularly limited. For example, stainless steel, aluminum, nickel, titanium, baked carbon, or an aluminum or stainless steel surface treated with carbon, nickel, titanium, or silver and the like may be used. The thickness of the positive electrode current collector may typically be 3 to 500 µm, and fine hills and valleys may be formed on the surface of the current collector and increase the adhesiveness of the positive electrode active material. The positive electrode current collector may be used in a variety of forms, for example, a film, a sheet, a foil, a net, a porous body, a foamed body, or a non-woven fabric body and the like.

Along with the positive electrode active material described above, the positive electrode active material layer may include a conductive material and a binder.

Here, a conductive material which is used for imparting conductivity to the electrode and does not cause chemical changes to the battery may be used without particular limit as the conductive material. Specific examples may include a graphite such as natural graphite or synthetic graphite; carbon-based materials such as carbon black, acetylene black, Ketjen black, channel black, furnace black, lamp black, thermal black, or carbon fiber; a metal powder or metal fiber such as copper, nickel, aluminum, or silver; a conductive whisker such as zinc oxide or potassium titanate; a conductive metal oxide such as titanium oxide; or a conductive polymer such as a polyphenylene derivative. One or a mixture of two or more thereof may be used. Typically, 1 to 30 wt % of the conductive material may be included with respect to the total weight of the positive electrode active material layer.

The binder may have the role of improving the adhesion amongst the positive electrode active material particles and the adhesiveness between the positive electrode active material and the current collector. Specific examples may include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluorocarbon rubber, or various copolymers thereof, and one or a mixture of two or more thereof may be used. 1 to 30 wt % of the binder may be included with respect to the total weight of the positive electrode active material layer.

Other than using the positive electrode active material described above, the positive electrode may be manufactured according to a typical positive electrode manufacturing method. Specifically, after applying onto a positive electrode current collector, a composition for forming a positive electrode active material including the positive electrode active material and, selectively, a binder and a conductive material, the composition may be dried and rolled to manufacture the positive electrode. Here, the type and content of each of the positive electrode active material, the binder, and the conductive material is as described above.

A typical solvent used in the field may be used as the solvent, for example, dimethyl sulfoxide (DMSO), isopropyl alcohol, n-methylpyrrolidone (NMP), acetone, or water, and one or a mixture of two or more thereof may be used. The amount of the solvent is sufficient when capable of dissolving or dispersing the positive electrode active material, the conductive material, and the binder in consideration of the thickness of the applied slurry and the manufacturing yield, and resulting in a viscosity that enables the slurry to have excellent thickness uniformity when subsequently applied in order to manufacture the positive electrode.

In another method, the electrode may also be manufactured by casting a composition for forming the positive electrode active material on a separate support and then laminating on the positive electrode current collector, a film obtained by being exfoliated from the support.

According to another embodiment of the present disclosure, an electrochemical device including the positive electrode is provided. The electrochemical device may specifically be a battery or a capacitor and the like, and more specifically, may be a lithium secondary battery.

The lithium secondary battery specifically includes a positive electrode, a negative electrode positioned facing the positive electrode, a separator disposed between the positive electrode and the negative electrode, and an electrolyte, the positive electrode being the same as described above. The lithium secondary battery may selectively further include a battery case housing an electrode assembly composed of the positive electrode, the negative electrode, and the separator, and a sealing member which seals the battery case.

In the lithium secondary battery, the negative electrode includes a negative electrode current collector and a negative electrode active material layer positioned on the negative electrode current collector.

The negative electrode current collector which is highly conductive and does not cause chemical changes to the battery is not particularly limited. For example, copper, stainless steel, aluminum, nickel, titanium, baked carbon, or a copper or stainless steel surface treated with carbon, nickel, titanium, silver, etc., or an aluminum-cadmium alloy and the like may be used. The negative electrode current collector may typically have a thickness of 3 to 500 μm, and as in the positive current collector, fine hills and valleys may be formed on the surface of the current collector and increase the adhesiveness of a negative electrode active material. The negative electrode current collector may be used in a variety of forms, for example, a film, a sheet, a foil, a net, a porous body, a foamed body, or a non-woven fabric body and the like.

Along with the negative electrode active material, the negative electrode active material layer may selectively include a binder and a conductive material. The negative electrode active material layer may be prepared, for example, by applying and drying on the negative electrode current collector, a composition for forming a negative electrode which includes the negative electrode active material and, selectively, the binder and conductive material, or by casting the composition for forming the negative electrode on a separate support and laminating on the negative electrode current collector, a film obtained by being exfoliated from the support.

A compound capable of reversible lithium intercalation and deintercalation may be used as the negative electrode active material. Specific examples may include a carbonaceous material such as synthetic graphite, natural graphite, graphitized carbon fiber, or amorphous carbon; a metallic compound that can be alloyed with lithium, such as Si, Al, Sn, Pb, Zn, Bi, In, Mg, Ga, Cd, a Si alloy, a Sn alloy, or an Al alloy; a metal oxide that can dope and dedope lithium, such as $SiO_x$ (0<x<2), $SnO_2$, vanadium oxide, or lithium vanadium oxide; or a composite that includes the metallic compound and the carbonaceous material, such as a Si—C composite or a Sn—C composite, and one or a mixture of two or more thereof may be used. Moreover, a metal lithium thin film may be used as the negative electrode active material. Both low-crystallinity carbon and high-crystallinity carbon may be used as the carbon material. Soft carbon and high carbon are representative low-crystallinity carbons, while amorphous, planar, flake, spherical, or fiber-shaped natural or synthetic graphite, and high-temperature baked carbons such as Kish graphite, pyrolytic carbon, mesophase pitch based carbon fiber, meso-carbon microbeads, meso-phase pitches, and petroleum or coal tar pitch derived cokes are representative high-crystallinity carbons.

The binder and the conductive material may be the same as described for the positive electrode.

Meanwhile, in the lithium secondary battery, the separator separates the negative electrode from the positive electrode and provides a movement path for lithium ions, and a separator typically used in lithium secondary batteries may be used without particular limit. In particular, it is desirable for the separator to have low resistance to ionic movement in the electrolyte and excellent electrolyte solution-absorbing ability. Specifically, a porous polymer film, for example, a porous polymer film prepared using a polyolefin-based polymer such as an ethylene homopolymer, a propylene homopolymer, an ethylene/butene copolymer, an ethylene/hexene copolymer, or an ethylene/methacrylate copolymer, or a laminated structure of two or more layers thereof may be used. A typical porous non-woven fabric, for example, a non-woven fabric composed of a high-melting point glass fiber or polyethylene terephthalate fiber may also be used. A coated separator including a ceramic component or polymer material for heat resistance or mechanical strength may be used, and may be selectively used as a single- or multi-layered structure.

The electrolyte used in the present disclosure may be an organic liquid electrolyte, an inorganic liquid electrolyte, a solid polymer electrolyte, a gel-type polymer electrolyte, a solid inorganic electrolyte, or a melting-type inorganic electrolyte and the like, but is not limited thereto.

Specifically, the electrolyte may include an organic solvent and a lithium salt.

An organic solvent which is capable of having the role of a medium—in which ions involved in the electrochemical reactions of a battery can move—may be used without particular limit. Specifically, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone, an aromatic hydrocarbon-based solvent such as benzene or fluorobenzene; a carbonate-based solvent such as dimethylcarbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; a nitrile such as R—CN (where R is a C2 to C20 linear, branched, or cyclic hydrocarbon group, and may include a double-bonded aromatic ring or an ether bond); an amide such as dimethylformamide; a dioxolane such as such as 1,3-dioxolane; or a sulfolane may be used. Among these, the carbonate-based solvent is desirable, and a mixture of a high-ionic conductivity, high-permittivity cyclic carbonate (for example, ethylene carbonate, propylene carbonate) which can increase the charge/discharge performance of the battery, and a low-viscosity linear carbonate-based compound (for example, ethyl methyl carbonate, dimethyl carbonate, or diethyl carbonate) is more desirable. In this case, excellent electrolyte solution performance may be exhibited by using the cyclic carbonate and the linear carbonate mixed in a volume ratio of about 1:1 to about 1:9.

A lithium salt which can provide lithium ions used in the lithium secondary battery may be used as the lithium salt without particular limit. Specifically, $LiPF_6$, $LiClO_4$, $LiAsF_6$, $LiBF_4$, $LiSbF_6$, $LiAlO_4$, $LiAlCl_4$, $LiCF_3S\ O_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ and the like may be used as the lithium salt. It is desirable for the lithium salt concentration to be in the range of about 0.1 to 2.0 M. Since the electrolyte has a desirable conductivity and viscosity when the lithium salt concentration is within this range, excellent electrolyte performance may be exhibited, and the lithium ions may move effectively.

In the electrolyte, in addition to the above components forming the electrolyte, at least one type of additive may be further included in order to improve battery lifetime, inhibit battery capacity reduction, or improve battery discharge capacity, etc., for example, a haloalkylene carbonate-based compound such as difluoroethylene carbonate, pyridine, triethyl phosphate, triethanolamine, cyclic ether, ethylene diamine, n-glyme, hexaphosphoric triamide, a nitrobenzene derivative, sulfur, a quinone imine dye, n-substituted oxazolidinone, n,n-substituted imidazolidine, ethylene glycol dialkyl ether, ammonium salt, pyrrole, 2-methoxy ethanol, or aluminum trichloride. Here, the additive content may be 0.1 to 5 wt % with respect to the total weight of the electrolyte.

As above, a lithium secondary battery including a positive electrode active material according to the present disclosure reliably exhibits an excellent discharge capacity, excellent output characteristics, and an excellent capacity maintenance ratio, and thus is useful in the fields of mobile devices such as mobile phones, notebook computers, digital cameras, etc., and electric vehicles, such as hybrid electric vehicles (HEV).

According to another embodiment of the present disclosure, a battery module including the lithium secondary battery as a unit cell, and a battery pack including the same are provided.

The battery module or battery pack may be used as a power source for one or more mid- to large-scale devices among power tools; electric cars such as electric vehicles (EV), hybrid electric vehicles, and plug-in hybrid electric vehicles (PHEV); and electrical power storage systems.

Hereinafter, examples of the present disclosure are described in detail to enable a person with ordinary knowledge in the art to easily carry out the present disclosure. However, the present disclosure may be realized in various different forms and is not limited to the examples described herein.

Examples 1-1 to 1-3, Comparative Examples 1-1 and 1-2: Preparation of Positive Electrode Active Material A 2 M metal salt solution was prepared by mixing nickel sulfate ($NiSO_{4-}$):cobalt sulfate ($Co(SO_4)_2$):manganese sulfate ($MnSO_4$) in a molar ratio of 15:15:70 in water. After placing 3 liters of deionized water in a coprecipitation reactor (capacity: 30 L), a 0.5 L/min nitrogen purge was used to remove the oxygen dissolved in the water and generate a non-oxidizing atmosphere in the reactor. Stirring was performed at 500 rpm while maintaining the temperature in the reactor at 50° C. After introducing the metal salt solution into the reactor, a 10 M ammonium solution was continuously introduced into the reactor at a rate of 2 g/min as a chelating agent, and a pH of 11 was maintained by continuously introducing a 4 M NaOH aqueous solution into the reactor at a rate of 14 g/min. Next, a coprecipitation reaction was performed while stirring at 500 rpm using an impeller. The coprecipitation reaction was performed over a total of 10 hours to obtain a precipitate having an average particle diameter ($D_{50}$) of 4 μm. The obtained precipitate was successively washed using sodium hydroxide and then deionized water, filtered, and dried in a warm-air dryer for 12 hours at 130° C. to obtain a precursor having an average particle diameter of ($D_{50}$) of 4 μm.

$Li_2CO_3$ was added as a lithium salt to the precursor prepared as above in an amount such that the ratio between the sum molar amount of Ni, Mn, and Co and the molar amount of lithium was 0.8:1.2. A dopant element raw material listed in Table 1 below was added to the mixture such that the dopant element content in the positive electrode active material was as displayed in Table 1.

Afterwards, by increasing the temperature at a rate of 2° C./min and heat treating at 950° C. for 10 hours, the positive electrode active material was prepared in the form of a secondary particle assembled from primary particles in which $Li_{1.2}(Ni_{0.15}Co_{0.15}Mn_{0.70})_{0.8}O_2$ is doped with the dopant element to a concentration listed in Table 1 below.

TABLE 1

|  | Dopant element raw material | Dopant element content in positive electrode active material | Dopant element |
|---|---|---|---|
| Example 1-1 | $MoO_3$ | 3,000 ppm | Mo |
| Example 1-2 | $NbCl_5$ | 3,000 ppm | Nb |
| Example 1-3 | $SnO_2$ | 3,000 ppm | Sn |
| Example 1-4 | $TaCl_5$ | 3,000 ppm | Ta |
| Comparative Example 1-1 | — | — | — |
| Comparative Example 1-2 | $MoO_3$ | 10,000 ppm | Mo |

Comparative Example 2-3: Preparation of Positive Electrode Active Material

A 2 M metal salt solution was prepared by mixing nickel sulfate ($NiSO_{4-}$):cobalt sulfate ($Co(SO_4)_2$):manganese sulfate ($MnSO_4$) in a molar ratio of 15:15:70 in water. A mixed metal salt solution was prepared by adding ammonium heptamolybdate tetrahydrate ($(NH_4)_6Mo_7O_{24} \cdot 4H_2O$) as a Mo raw material to the metal salt solution in an amount such that the molybdenum content in the ultimately prepared active material was 3,000 ppm. After placing 3 liters of deionized water in a coprecipitation reactor (capacity: 30 L), a 0.5 L/min nitrogen purge was used to remove the oxygen dissolved in the water and generate a non-oxidizing atmosphere in the reactor. Stirring was performed at 500 rpm while maintaining the temperature in the reactor at 50° C. After introducing the metal salt solution into the reactor, a 10 M ammonium solution was continuously introduced into the reactor at a rate of 2 g/min as a chelating agent, and a pH of 11 was maintained by continuously introducing a 4 M NaOH aqueous solution into the reactor at a rate of 14 g/min. Next, a coprecipitation reaction was performed while stirring at 500 rpm using an impeller. The coprecipitation reaction was performed over a total of 10 hours to obtain a precipitate having an average particle diameter ($D_{50}$) of 4 μm. The obtained precipitate was successively washed using sodium hydroxide and then deionized water, filtered, and dried in a warm-air dryer for 12 hours at 130° C. to obtain a precursor having an average particle diameter of ($D_{50}$) of 4 μm.

A positive electrode active material in the form of a secondary particle assembled from primary particles in which $Li_{1.2}(Ni_{0.15}Co_{0.15}Mn_{0.70})_{0.8}O_2$ is doped with Mo was prepared by adding to the precursor prepared as above, $Li_2CO_3$ as a lithium salt in an amount such that the ratio between the sum molar amount of Ni, Mn, and Co and the molar amount of lithium was 0.8:1.2, and then, after increasing the temperature at a rate of 2° C./min, heat treating for 10 hours at 950° C.

Examples 2-1 to 2-4, Comparative Examples 2-1 to 2-3: Manufacture of Lithium Secondary Battery A positive electrode active material listed in Table 2 below, carbon black as a conductive material, and PVDF as a binder were mixed in a weight ratio of 90:5:5 and then mixed with n-methylpyrrolidone as a solvent to prepare a composition (viscosity: 5000 mPa·s) for forming a positive electrode, and after being applied onto an aluminum current collector, the composition was dried and rolled to manufacture a positive electrode.

Mesocarbon microbead (MCMB)—a synthetic graphite—as a negative electrode active material, carbon black as a conductive material, and PVDF as a binder were mixed in a weight ratio of 85:10:5 and then mixed with n-methylpyrrolidone as a solvent to prepare a composition for forming a negative electrode active material, and the composition was applied to a copper current collector to manufacture a negative electrode.

To manufacture an electrode assembly, porous polyethylene as a separator was disposed between the positive electrode and negative electrode manufactured as above, and after placing the electrode assembly inside a case, an electrolyte solution was injected into the case to manufacture a lithium secondary battery. Here, the electrolyte solution was prepared by dissolving 1.15 M lithium hexafluorophosphate in an organic solvent composed of ethylene carbonate/dimethylcarbonate/ethylmethylcarbonate (mixing ratio by weight of EC/DMC/EMC=3/4/3).

TABLE 2

|  | Positive electrode active material |
|---|---|
| Example 2-1 | Example 1-1 |
| Example 2-2 | Example 1-2 |
| Example 2-3 | Example 1-3 |
| Example 2-4 | Example 1-4 |
| Comparative Example 2-1 | Comparative Example 1-1 |
| Comparative Example 2-2 | Comparative Example 1-2 |

Experimental Example 1-1: Evaluation of Positive Electrode Active Material Properties (1)

The average particle diameter ($D_{50}$) and the dopant element concentration at particular locations in a primary particle of the positive electrode active material were measured for the positive electrode active material in Examples 1-1 to 1-4 and Comparative Examples 1-1 to 1-3 using the method described below, and the results are displayed in Table 3 below.

(1) Average particle diameter ($D_{50}$): after placing the positive electrode active material in a laser diffraction particle size analyzer (for example, the Microtrac MT 3000), the average particle diameter ($D_{50}$) was calculated as the particle diameter at 50% in the particle diameter distribution obtained from the particle size analyzer.

(2) Measurement of dopant element concentration: x-ray photoelectron spectroscopy (XPS) was used to measure the ratio of the atomic percentage of the dopant element with respect to the sum of the atomic percentages of nickel, cobalt, and manganese on the outermost surface in terms of the radius of the primary particle, and Energy Dispersve x-ray spectroscopy(EDS) was used to measure the ratio of the atomic percentage of the dopant element with respect to the sum of the atomic percentages of nickel, cobalt, and manganese in the center region of the primary particle, and the difference was calculated.

TABLE 3

| | Average particle diameter of positive electrode active material secondary particle ($D_{50}$, μm) | Ratio of atomic percentage of dopant element (M) with respect to sum of atomic percentages of nickel (Ni), cobalt (Co), and manganese (Mg) | |
|---|---|---|---|
| | | Surface | Center |
| Example 1-1 | 4.53 | 0.643 | 0.011 |
| Example 1-2 | 4.20 | 0.673 | 0.010 |
| Example 1-3 | 4.60 | 0.321 | 0.004 |
| Example 1-4 | 4.30 | 0.542 | 0.003 |
| Comparative Example 1-1 | 4.42 | 0 | 0 |
| Comparative Example 1-2 | 4.85 | 2.316 | 0.010 |
| Comparative Example 1-3 | 4.65 | 0.172 | 0.130 |

Referring to Table 3, from the measurement results, it was confirmed that in the positive electrode active materials in Examples 1-1 to 1-4, the dopant element content on the surface was higher than the dopant element content in the interior of the primary particle.

However, the dopant element was not detected in the case of the positive electrode active material in Comparative Example 1-1, the dopant element concentration difference between the center region and the surface of the primary particle was large in the case of the positive electrode active material in Comparative Example 1-2, and there was almost no difference in the amount of dopant element due to the distance from the surface of the primary particle in the case of the positive electrode active material in Comparative Example 1-3.

Experimental Example 1-2: Evaluation of Positive Electrode Active Material Properties (2)

Figure 2:
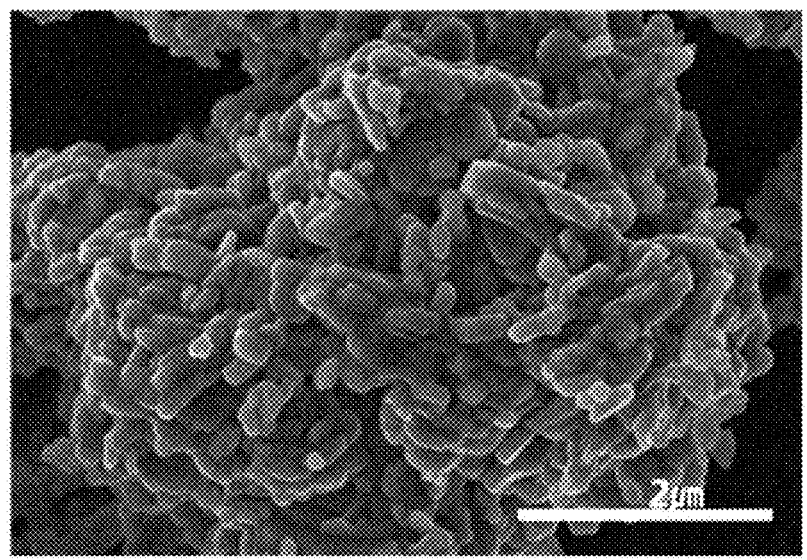
FIG. 2 is a scanning electron microscopy image of a positive electrode active material in Comparative Example 1-1.

The surface of the positive electrode active material in Example 1-1 and Comparative Example 1-1 was measured using scanning electron microscopy. The results are displayed in FIGS. 1 and 2, respectively.

From the measurement results, it was confirmed that there are no observed differences between the respective surfaces of the positive electrode active materials in Example 1-1 and Comparative Example 1-1.

Experimental Example 1-3: Evaluation of Positive Electrode Active Material Properties (3)

Using the methods described below, the specific surface area and tap density were measured for the positive electrode active material in Example 1-1 and Comparative Example 1-1, and the results are displayed in Table 4.

(1) BET specific surface area: the specific surface area of the positive electrode active material was measured using the BET method, and specifically, may be derived using the BEL Japan BELSORP-mino II, from the amount of nitrogen gas adsorption at the liquid nitrogen temperature (77 K).

(2) Tap density: the tap density was measured using a tap density analyzer (HPRM-A1, Hantech) under a pressure of 2 tonf/cm².

TABLE 4

| | BET specific surface area (m²/g) | Tap density (g/cc) |
|---|---|---|
| Example 1-1 | 2.492 | 1.33 |
| Comparative Example 1-1 | 2.523 | 1.31 |

Referring to FIG. 4, it can be confirmed that the tap density difference between the positive electrode active material in Example 1-1 and the positive electrode active material in Comparative Example 1-1 is not large.

Experimental Example 2-1: Evaluation of Lithium Secondary Battery Properties (1)

The lithium secondary batteries in Example 2-1 and Comparative Examples 2-1 to 2-3 were charged/discharged for 30 cycles at 0.5 C/0.5 C conditions at room temperature (25° C.) at an operating voltage of 4.65 V. Afterwards, the discharge capacity and capacity retention were measured, and the results are displayed in Table 5 below. Meanwhile, the results for Example 2-1 and Comparative Example 2-1 are also displayed in FIG. 3.

Here, discharge capacity retention indicates the ratio between the discharge capacity at each cycle and the initial capacity.

TABLE 5

| | Example 2-1 | Comparative Example 2-1 | Comparative Example 2-2 | Comparative Example 2-3 |
|---|---|---|---|---|
| Discharge capacity (mAh/g) | 266 | 274 | 235 | 258 |
| Discharge capacity retention (%) | 91 | 82 | 95 | 91 |

Figure 3:
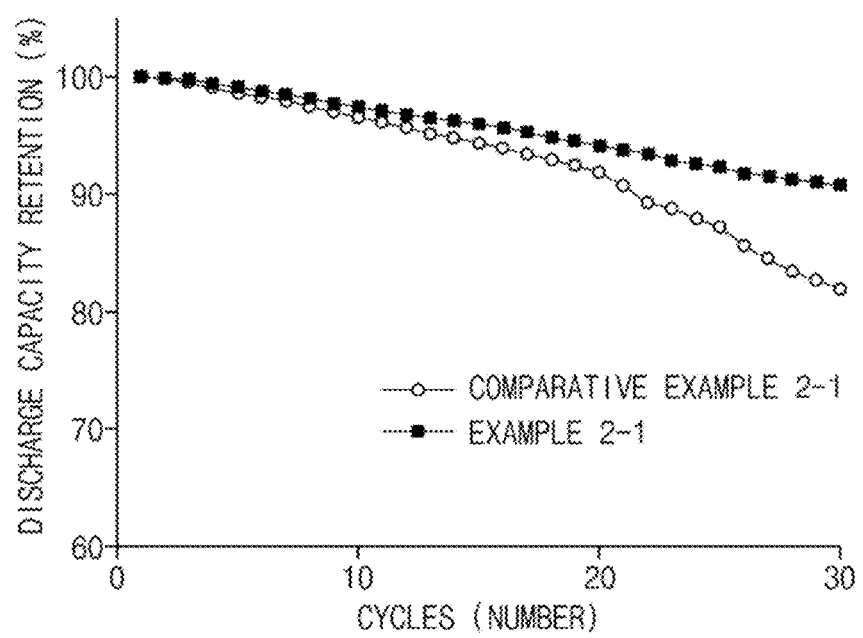
FIG. 3 is a graph displaying the discharge capacity retention according to the number of high-voltage operation cycles for secondary batteries in Example 2-1 and Comparative Example 2-1.

Referring to FIG. 3 and Table 5, it can be confirmed that in contrast to the lithium secondary battery in Example 2-1, which is excellent in terms of both discharge capacity and discharge capacity retention, the lithium secondary battery in Comparative Example 2-1 is deficient in terms of discharge capacity retention, and the lithium secondary batteries in Comparative Examples 2-2 and 2-3 are deficient in terms of discharge capacity.

In a positive electrode active material for a secondary battery according to an embodiment of the present disclosure, the manganese content is high, and the high content of a dopant element on the surface of a primary particle improves the surface stability of a primary particle such that the occurrence of side reactions with an electrolyte solution is not a concern. Consequently, when applied to a battery, the capacity and lifetime properties of the battery may be improved, and in particular, the degradation of lifetime properties under high voltage may be minimized. Accordingly, the positive electrode active material according to the present disclosure is useful for batteries, such as electric cars or power tools, requiring a high capacities and lifetime properties, and in particular, for batteries such as electric car batteries requiring minimized degradation of the lifetime properties under high voltage.

What is claimed is:

1. A positive electrode active material for a secondary battery, the positive electrode active material being a secondary particle comprising primary particles of a lithium composite metal oxide represented by Formula 1, $$Li_2(Ni_xCo_yMn_zM_s)_{2-a}O_2$$ [Formula 1]

where M includes one or two or more dopant elements selected from the group consisting of Nb, Sn, Mo, and Ta, and the conditions 1≤a≤1.5, 0<x<0.5, 0<y<0.5, 0<x+y<0.5, 0.5<z<1−x−y−s, x+y+z+s=1 are satisfied, wherein
the dopant element content being higher in a surface region of the primary particle than in the interior of the primary particle, and the dopant element concentration being 500 ppm to 5,000 ppm with respect to the total weight of the positive electrode active material.

2. The positive electrode active material of claim 1, wherein the surface region of the primary particle is a region in which the distance from the center of the primary particle is more than 70% and at most 100% of the particle radius.

3. The positive electrode active material of claim 1, wherein the difference, between the outermost surface of the primary particle and the center of the primary particle, in the ratio of the atomic percentage of the dopant element to the sum of the atomic percentages of nickel, cobalt, and manganese is 0.2 to 1.2.

4. The positive electrode active material of claim 1, wherein the dopant element is distributed such that there is a gradually increasing concentration gradient thereof from the center to the surface of the primary particle.

5. The positive electrode active material of claim 1, wherein z satisfies the condition 0.6≤z≤0.8.

6. The positive electrode active material of claim 1, wherein the average particle diameter ($D_{50}$) is 3 μm to 20 μm.

7. The positive electrode active material of claim 1, wherein the BET specific surface area is 0.1 m²/g to 3 m²/g, and the tap density is at least 1.0 g/cc.

8. A method for preparing the positive electrode active material for a secondary battery according to claim 1, the method comprising:
preparing a precursor by mixing a nickel raw material, a cobalt raw material, and a manganese raw material, and then performing a coprecipitation reaction; and
mixing the precursor with a lithium raw material and a dopant element-containing raw material, and then heat treating at a temperature of 900° C. to 1,100° C.,
wherein the manganese raw material is used in an amount such that the manganese content exceeds 50 at % with respect to the sum content of nickel, cobalt, and manganese, and
wherein the dopant element-containing raw material is used in an amount such that the concentration of the dopant element is 500 ppm to 5,000 ppm with respect to the total weight of the positive electrode active material that is ultimately prepared, the dopant element including one or two or more selected from the group consisting of Nb, Sn, Mo, and Ta.

9. A positive electrode for a lithium secondary battery, the positive electrode comprising the positive electrode active material according to claim 1.

10. A lithium secondary battery comprising the positive electrode according to claim 9.

11. The positive electrode active material of claim 1, wherein the dopant element concentration being 500 ppm to 3,000 ppm with respect to the total weight of the positive electrode active material.

* * * * *